United States Patent [19]

Hwang et al.

[11] Patent Number: 4,865,576
[45] Date of Patent: Sep. 12, 1989

[54] TENSIONER FOR AN ENDLESS BELT DRIVEN WOOD LATHE

[75] Inventors: Shin L. Hwang, St. Peters; Roger O. Claghorn, Florissant, both of Mo.

[73] Assignee: Emerson Electric Co., St. Louis, Mo.

[21] Appl. No.: 242,649

[22] Filed: Sep. 12, 1988

[51] Int. Cl.$^4$ ............................................... F16H 7/14
[52] U.S. Cl. ..................................... 474/114; 474/115
[58] Field of Search .............................. 474/113–118; 74/501.5 R

[56] References Cited

U.S. PATENT DOCUMENTS

| | | | |
|---|---|---|---|
| 1,748,296 | 2/1930 | Lombard | 474/114 X |
| 2,200,175 | 5/1940 | Kaestner | 474/114 X |
| 2,875,626 | 3/1959 | Niederer et al. | 474/114 X |
| 3,382,728 | 5/1968 | Takahashi | 474/114 |
| 4,503,792 | 3/1985 | Cook | 474/114 X |
| 4,518,371 | 5/1985 | Hanson | 474/114 |
| 4,583,514 | 4/1986 | Nozato | 474/114 X |

Primary Examiner—Jerome W. Massie, IV
Assistant Examiner—M. Smith

Attorney, Agent, or Firm—Polster, Polster & Lucchesi

[57] ABSTRACT

An endless belt driven wood lathe or the like is disclosed as having an endless belt tension adjustment device for a motor driven belt pulley and associated endless belt. The belt pulley is driven by a generally horizontal shaft extending from a motor that is pivotally mounted to a motor housing. The motor is pivotally mounted to the motor housing along a shaft that is generally parallel to the motor shaft about which the belt pulley is journalled. An endless belt adjustment device is connected to the motor through adjustable slot means in the motor housing to cause the motor to be pivoted relative to the motor housing while predetermined spring tension force is applied to the motor, including the motor shaft journalled belt pulley and endless belt entrained thereabout. The belt pulley preferably includes a series of stepped pulley sections each having an outer surface which is configured to engage a poly-V endless belt in a compact and efficient construction. A simply constructed and easy-to-assemble supporting bed for the wood lathe or the like is also disclosed.

14 Claims, 7 Drawing Sheets

TENSIONER FOR AN ENDLESS BELT DRIVEN WOOD LATHE

BACKGROUND OF THE INVENTION

The present invention relates to an endless belt driven wood lathe or the like, and more particularly, to an endless belt tension adjustment device for a motor driven belt pulley and associated endless belt, and to a supporting bed for supporting the various components of the wood lathe or the like.

Most machine or shop tools utilize gear drive units in conveying power between a motor and an operating machine tool element, so as to avoid any power loss. On the other hand, gear drive units are too costly for machines such as wood lathes designed for use in home workshops and for limited shop use. Typically, driving and driven pulley arrangements are used as the power transmitting force between a motor and a driven or rotating element, where low cost in such machines is a prime factor. It will also be apparent that such drive and driven pulley arrangements can be used in other machinery and industrial applications.

Where belt pulley drive and driven arrangements are used, it is important that as much power as possible be transmitted from the motor to the belt pulley drive, the endless belt entrained about the belt pulley drive, and the belt pulley driven element driven by the endless belt. At the same time, the drive and driven belt pulleys must be adapted for different speeds, enabling use in specific work applications, as desired. In addition to the proper speed, the endless belt must be properly tensioned relative to the drive and driven pulley so as to avoid power loss caused by belt slippage. With a loose endless belt, it will be appreciated that power will be lost and the drive and driven belt pulley arrangement will not function as intended.

Other conditions come into play in the design of an endless belt driven wood lathe or the like for home use including the design and construction of the other components, such as the supporting bed, to provide a cost effective, easy-to-assemble system for home and limited shop use.

SUMMARY OF THE INVENTION

Accordingly, among the several objects and advantages of the present invention may be noted:

The provision of a new and improved belt pulley drive and driven arrangement which meets all of the aforementioned requirements;

The provision of the aforementioned belt pulley drive and driven arrangement which transmits substantially all available power from a motor to a driven element;

The provision of the aforementioned belt pulley drive and driven arrangement which provides a highly efficient power transmission in simple and compact construction;

The provision of the aforementioned belt pulley drive and driven arrangement including an endless belt tension adjustment device for a motor driven belt pulley and associated endless belt;

The provision of the aforementioned endless belt tension adjustment device which provides both adjustment and spring tension in adjusting a belt pulley and associated endless belt so as to avoid belt slippage and power loss;

The provision of a supporting bed in a machine, such as a wood lathe or the like, which provides a simple, compact, economical, and easy-to-assemble construction.

Briefly stated, the present invention relates to an endless belt tension adjustment device for a motor driven belt pulley and associated endless belt. A motor is positioned within a motor housing, the motor having a generally horizontally extending shaft extending from one end of the motor. A belt pulley is journalled on the generally horizontally extending motor shaft and an endless belt is entrained about the belt pulley and is adapted to engage a complementary driven member such as a corresponding driven belt pulley. The motor is pivotally mounted to the motor housing along one side thereof and is in generally horizontally parallel relationship to the generally horizontally extending motor shaft. An endless belt adjustment device is connected to the motor and extends through adjustable slot means in the motor housing. The endless belt adjustment device is constructed to be positioned at various predetermined locations within the adjustable slot means to engage and cause the motor to be pivoted relative to the motor housing in order to apply predetermined tension adjustment forces to the endless belt entrained about the motor shaft journalled belt pulley.

The endless belt adjustment device includes an elongated spring lever pivotally mounted to the motor and constructed to engage the motor housing at various predetermined locations to adjust the motor including the motor shaft mounted belt pulley and entrained endless belt, for movement about the pivotal mounting of the motor relative to the motor housing, while also providing spring tension to the motor through the pivotal mounting of the elongated spring lever to the motor. The elongated spring lever includes an intermediate pivot portion for pivot mounting of the motor, a lever arm on one side of the intermediate pivot portion for engaging adjustable slot means in the motor housing to provide various predetermined adjustable pivotable mounting locations of the motor relative to the motor housing, and a spring arm portion constructed as a leaf spring on the other side of the intermediate pivot portion so as to impart spring tension to the motor throughout the various predetermined adjustable pivotal mounting locations thereof.

The adjustable slot means comprises a series of vertically offset and juxtaposed shoulder portions constructed for engagement by the lever arm portion of the elongated spring lever. The motor is pivotally mounted to the motor housing along a first pivot shaft which extends between opposite ends of the motor housing, and the elongated spring lever is pivotally mounted to the motor along a second pivot shaft generally parallel to the first pivot shaft and which extends between opposite ends of the motor.

The motor housing includes upper and lower housing sections which are slidably mounted with respect to one another. The motor is mounted in the lower housing section which includes a series of horizontally spaced and outwardly extending first shoulder portions along an upper area thereof for complementary engagement with horizontally spaced and inwardly extending second shoulder portions that underlie and engage the first shoulders of the lower housing section when the upper and lower housing sections are slidably assembled to one another.

The motor shaft journalled belt pulley includes a series of stepped pulley sections each having complementary configured outer surface for complementary co-mating engagement with an endless poly-V belt adapted to be engaged with any one of the series of stepped pulley sections. The endless poly-V belt is also adapted to engage any one of a series of similar stepped pulley sections in a driven pulley member also each having a corresponding complementary configured outer surface for engaging the poly-V endless belt.

A supporting bed for a wood lathe or the like may also be provided as including a pair of identical elongated bed sections having interfitting side portions and a butt joint along upper bed surfaces, with the interfitting side portions having aligned openings therethrough for receiving threaded fasteners. The elongated bed sections further have integral supporting feet underlying the elongated bed sections at opposite sides of each elongated bed section and at opposite free ends thereof. An independent center bed mounting bracket is positioned on one side of the supporting bed adjacent the interfitting side portion of the elongated bed sections, with the center bed mounting bracket having a supporting foot portion and a connecting wall extending substantially normal to each supporting foot. The connecting wall has elongated openings therein for adjustable alignment relative to the aligned openings in the interfitting side portions, whereby the upper bed surfaces of the elongated bed section can be horizontally aligned relative to one another, while permitting adjustment of the center bed mounting brackets, along with threaded fastener re-positionment in the elongated openings thereof. Each elongated bed section includes a T-shaped cross section throughout, except in the area of the interfitting side portions and integral supporting feet. The integral supporting feet of each elongated bed section and the supporting foot portion of the independent center bed mounting bracket are provided with openings for receiving fasteners to attach same to a work bench or the like.

These and other objects and advantages of the present invention will become more apparent from the description that follows.

BRIEF DESCRIPTION OF THE DRAWINGS

In the drawings.

Corresponding reference numerals will be used throughout the various FIGS. of the drawings.

DESCRIPTION OF THE PREFERRED EMBODIMENT

Figure 1:
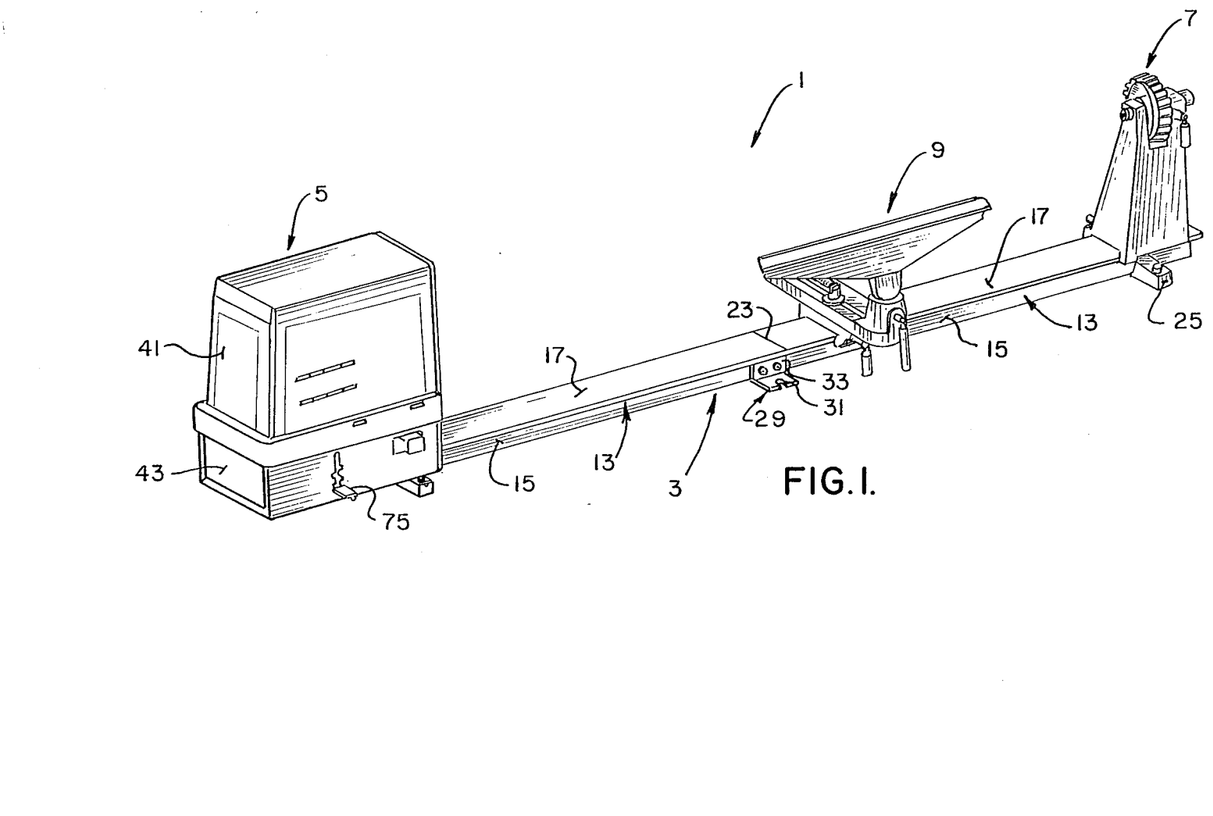
FIG. 1 is an isometric view of a wood lathe including a supporting bed on which are mounted headstock and tailstock assemblies at opposite ends of the supporting bed and a combined tool rest slide, tool rest holder and tool rest mounted on the supporting bed between the headstock and tailstock assemblies.

Referring first to FIG. 1 of the drawings, the wood lathe 1 is shown as a motor driven tool that consists of several major components and assemblies of components which are constructed and arranged to hold a wooden spindle or disk workpiece (not shown) for cutting or shaping thereof. The wood lathe 1 includes a supporting bed 3, a headstock assembly 5 mounted on the supporting bed 3 at one end thereof, a tailstock assembly 7 also mounted on the supporting bed 3 at the other end thereof, and a combined tool rest slide, tool holder and tool rest assembly 9 also mounted on the supporting bed 3 intermediate the head stock and tail stock assemblies 5, 7 respectively.

The headstock assembly 5 is fixedly mounted by any suitable means at the left end or side of the supporting bed 3 and includes a spindle 11 (see FIG. 2) which supports a workpiece (not shown) on center and transmits power from the spindle to the workpiece, causing same to rotate, as is well known. The spindle 11, installed in the headstock assembly 5, is generally referred to as the spur center or live center spindle because it rotates.

The tailstock assembly 7 at the other end of the supporting bed 3 is slidably mounted along the supporting bed 3, but can be locked to the supporting bed 3 at any point through the use of clamp bolt (not shown), as is well known. The tailstock assembly 7 includes a cup or dead center spindle that supports the workpiece on center, in cooperation with the spur or live center spindle 11 of the headstock assembly 5. Intermediate the headstock and tailstock assemblies 5, 7 respectively is a combined tool rest slide, tool rest holder and tool rest 9 consisting of 3 cast iron pieces which slide along the supporting bed 3, but can be fastened to it. The tool rest supports a turning tool (not shown) for turning of the workpiece (not shown) between centers or for face plate turning, all of which is well known in the art.

Other than the overall design of the tailstock assembly 7 and the combined tool rest slide, tool rest holder and tool rest 9, the function and operation of these components is well known in the art, and therefore, attention will be directed to the supporting bed 3 and the headstock assembly 5 having components thereof which are constructed in new and improved way, as will now be discussed.

Figure 6:
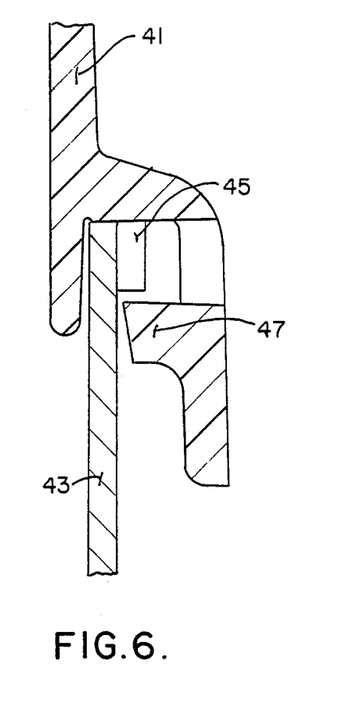
FIG. 6 is an enlarged greater than full-sized fragmentary sectional view illustrating the manner in which the upper and lower housing, sections of the motor housing are slidably assembled and secured relative to one another.
Figure 7:
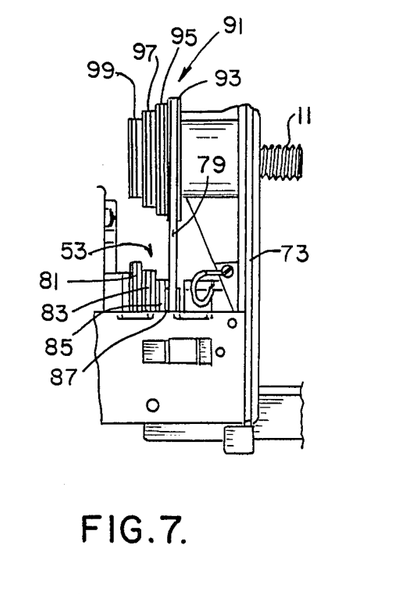
FIG. 7 is a fragmentary reduced-in-size front elevational view of the belt pulley drive and driven arrangement utilized in the assembly of the wood lathe.
Figures 8, 9:
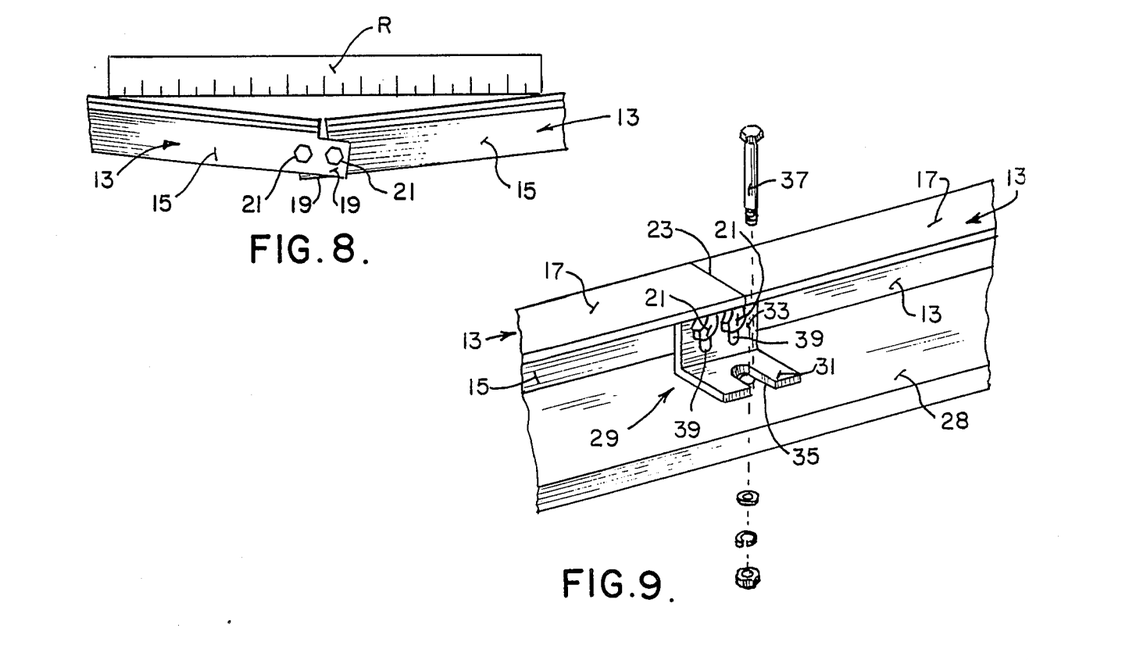
FIG. 8 is a fragmentary reduced-in-size front elevational view of the supporting bed and illustrating the manner in which connected elongated bed sections are horizontally aligned relative one another.
FIG. 9 is a fragmentary isometric view, partially exploded, illustrating the use of an independent center mounting bracket positioned on either/one side of the supporting bed in the area of the interfitting side portions of adjacent and interconnected bed sections.

As best seen in FIGS. 1-8, 9 and 10 of the drawings, the supporting bed 3 includes a pair of identical elongated bed sections 13, 13 having a general T-shaped cross section throughout. Specifically, each elongated bed section 13 has a vertical wall support 15 and a horizontal wall 17 extending substantially normal or perpendicular thereto in order to define the T-shaped cross sectional configuration. Each vertical wall portions 15 of each elongated bed section 13 has an interfitting side portion 19 extending from each vertical wall portion 15 along an inner end thereof so as to overlap in interfitting relationship to one another, as best seen in FIG. 8 of the drawings. Each of the interfitting side portions 19, 19 have aligned openings therethrough for receiving threaded fasteners 21 in order to assemble the pair of identical elongated bed sections 13, 13 relative to one another. When assembled together as shown in FIG. 1 of the drawings, a butt joint 23 is provided between the pair of identical elongated bed sections 13, 13 having interfitting and assembled side portions 19, 19.

Each of the elongated bed sections 13, 13 are provided with integral supporting feet 25, 25 attached to the vertical wall portion 15 on opposite sides of each elongated bed section 13 and at opposite free ends thereof. Openings are provided in each of the integral supporting feet 25 for receiving threaded fasteners 27 or the like to assemble the elongated bed sections 13, 13 to a workbench 28 as seen in FIG. 9 of the drawings.

The supporting bed 3 further includes a piece of independent center bed mounting bracket 29, positioned on opposite sides of the supporting bed 3 adjacent the interfitting side portions 19, 19 of the elongated bed sections 13, 13. The center bed mounting bracket 29 includes a supporting foot portion 31 and connecting wall 33 extending substantially normal to the supporting foot portion 31. The supporting foot portion 31 includes an opening 35 for receiving a threaded fastener 37 or the like for mounting the center mounting bed bracket 31 to the workbench 28. The connecting wall 33 of the center mounting bed bracket 21 also has parallel elongated openings 39, 39 therein for adjustable alignment relative to the aligned openings in the interfitting side portions 19, 19 of the elongated bed sections 13, 13.

The aforesaid construction enables the horizontal walls 17, 17, including upper bed surfaces thereof forming part of the elongated bed sections 13, 13, to be horizontally aligned relative to one another, as shown in FIG. 8 of the drawings, while permitting adjustment of the center bed mounting bracket 29, as well as threaded fastener re-positionment in the elongated openings 39, 39 and corresponding aligned openings in the interfitting side portions 19, 19 of the elongated bed sections 13, 13. As shown in FIG. 8 of the drawings, a ruler R can be used to horizontally align the elongated bed sections 13, 13 while, at the same time, the fasteners 21, 21 are adjustably re-positioned within the elongated openings 39, 39 of the center bed mounting bracket 29. It will thus be seen that a simplified and economical easy-to-assemble construction for a supporting bed 3 has been provided.

Figure 4:
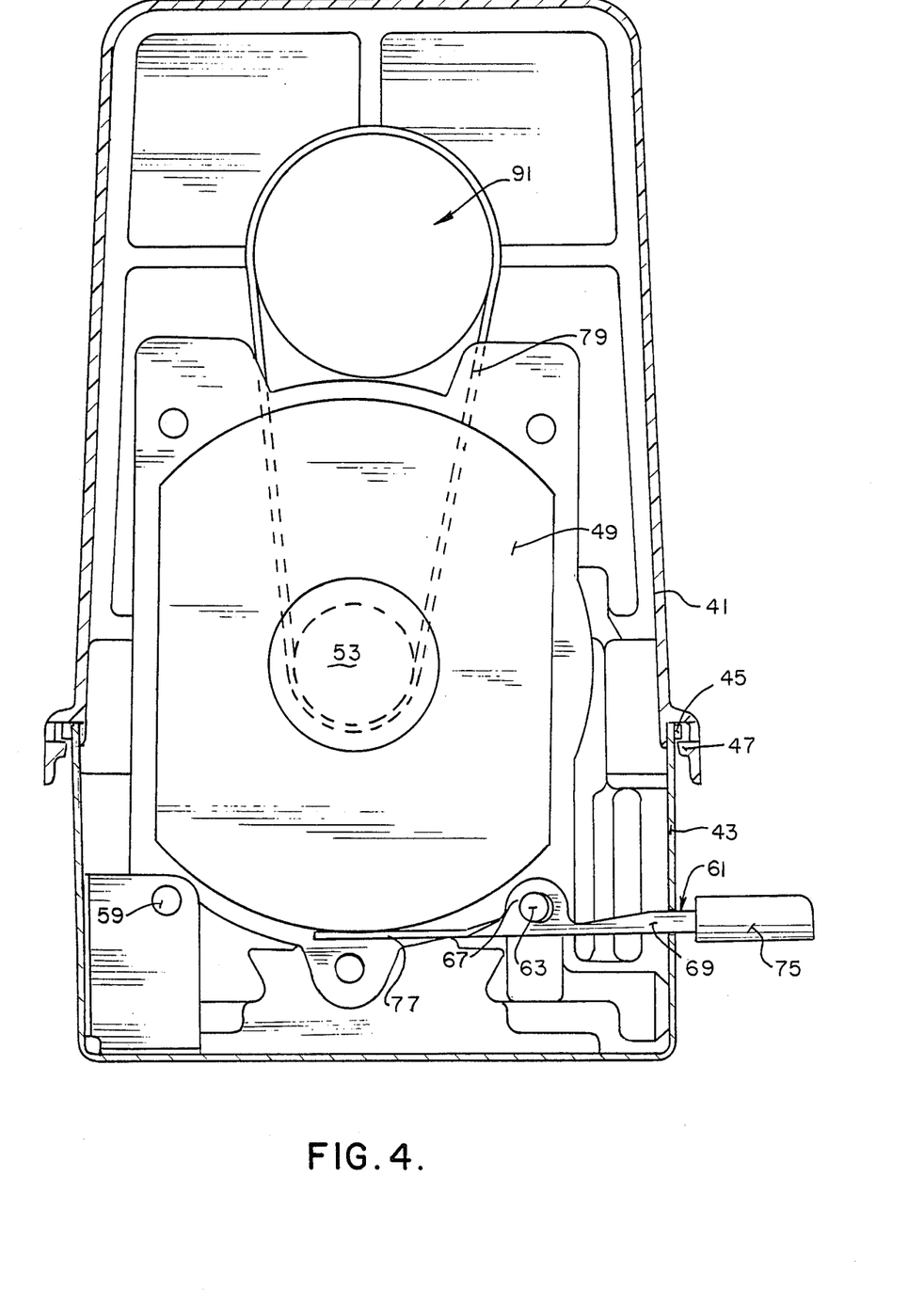
FIG. 4 is an enlarged full-size end sectional view illustrating the endless belt tension adjustment device for the motor driven belt pulley and associated endless belt.
Figure 5:
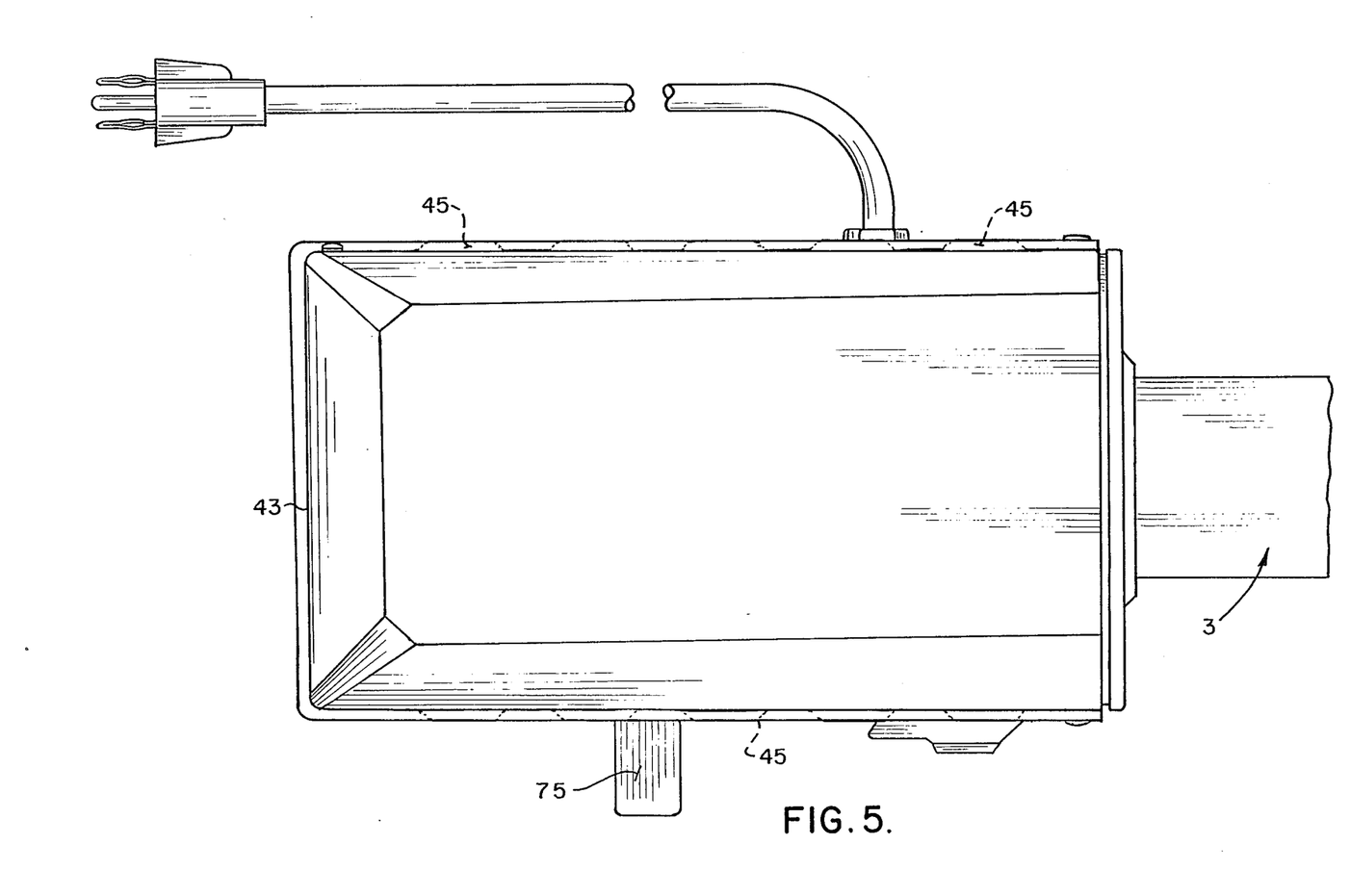
FIG. 5 is an enlarged full size top plan view of the lower housing section utilized in the motor housing of the headstock assembly.

Reference is now made to FIGS. 2-7 and 10 of the drawings for a description of the drive and driven belt pulley arrangement and endless belt tension adjustment device incorporated in the present invention. The headstock assembly 5 includes a motor housing which may be formed as upper and lower housing sections 41, 43 respectively that are slidably mounted and assembled relative to one another, as will become apparent. The upper housing section 41 has a rectangular shaped open bottomed construction adapted to be slidably mounted over the lower housing section 43 for containing the operating components of the headstock assembly 5 therein, as will become apparent. FIG. 5 of the drawings illustrates the construction of the lower housing section 43 as including a series of horizontally spaced and outwardly extending formed areas which form first shoulder portions 45 along an upper area of the lower housing section 43 for complementary engagement with horizontally spaced and inwardly extending second shoulder portions 47 associated with the upper housing 41 so as underlie and engage the first shoulders 45 of the lower housing section 43 when the upper and lower housing sections 41, 43 are slidably assembled to one another, as best shown in FIG. 6 of the drawings.

Figure 10:
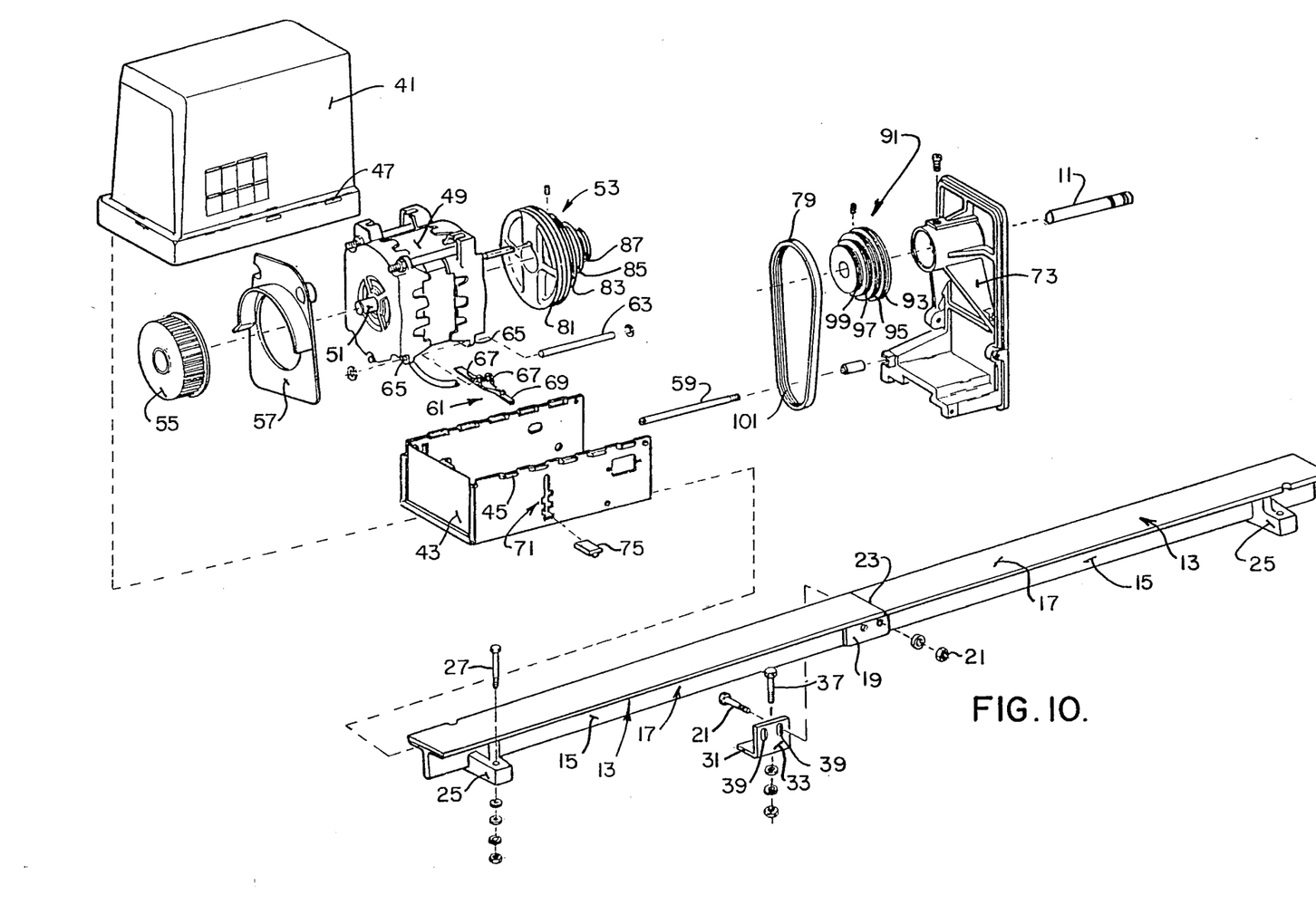
FIG. 10 is an exploded isometric view illustrating the principal components of the headstock assembly and supporting bed construction, incorporated in the herein disclosed wood lathe.

Motor 49 has a generally horizontally extending shaft 51 when positioned within the motor housing, comprising the upper and lower housing sections 41, 43, as described above. As best seen in FIG. 10 of the drawings, a belt pulley 53 is journalled on the generally horizontally extending shaft 51 at one end of the motor 49 with a fan wheel turbine 55, for cooling purposes, mounted on the other end of the shaft 51 with a fan housing 57 mounted in the motor housing juxtaposed the fan wheel turbine 55.

The motor 49 is pivotally mounted to the lower housing section 43 of the motor housing along one side thereof. Specifically, a motor pivot shaft 59 extends between one end of the lower housing section 43 and the headstock 73 forming the other end of the lower housing section 43. As best seen in FIG. 4 of the drawings, the motor pivot shaft 59 is positioned along one side of the motor, adjacent the bottom of the motor 49, and is threaded through suitable ears or lugs (not shown) attached to the motor 49. The motor pivot shaft 59 is in generally horizontally parallel relationship to the generally horizontally extending motor shaft 51, as shown in the drawings.

In order to provide an endless belt adjustment device, an elongated spring lever 61 is pivotally mounted to the motor 49 through the pivot shaft 63 that extends between spaced ears or lugs 65 associated with the motor 49. Specifically, the elongated spring lever 61 includes an intermediate pivot portion including a pair of upstanding and vertically extending pivot shaft supports 67, 67 which are threaded over the pivot shaft 63, between the integral lugs or ears 65, 65 of the motor 49. An integral lever arm 69 extends from one side of the intermediate pivot supports 67, 67 for engaging adjustable slot means 71 in the lower housing section 43, to provide various predetermined adjustable pivotable mounting locations of the motor 49 relative to the lower housing section 43.

Figure 2:
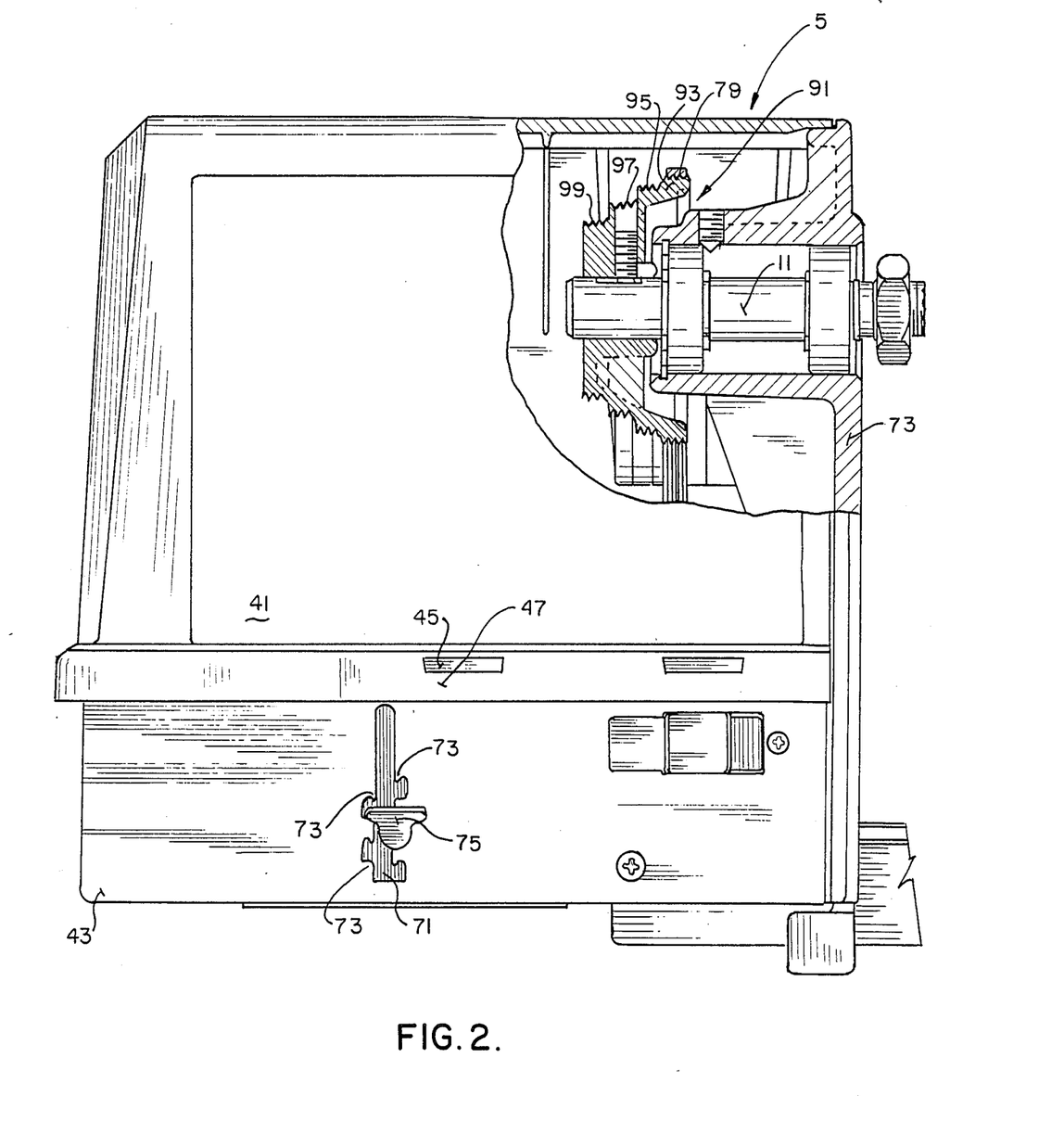
FIG. 2 is an enlarged full-size front elevational view, partly in section, of the headstock assembly, including driven components in the endless belt drive wood lathe of the present invention.
Figure 3:
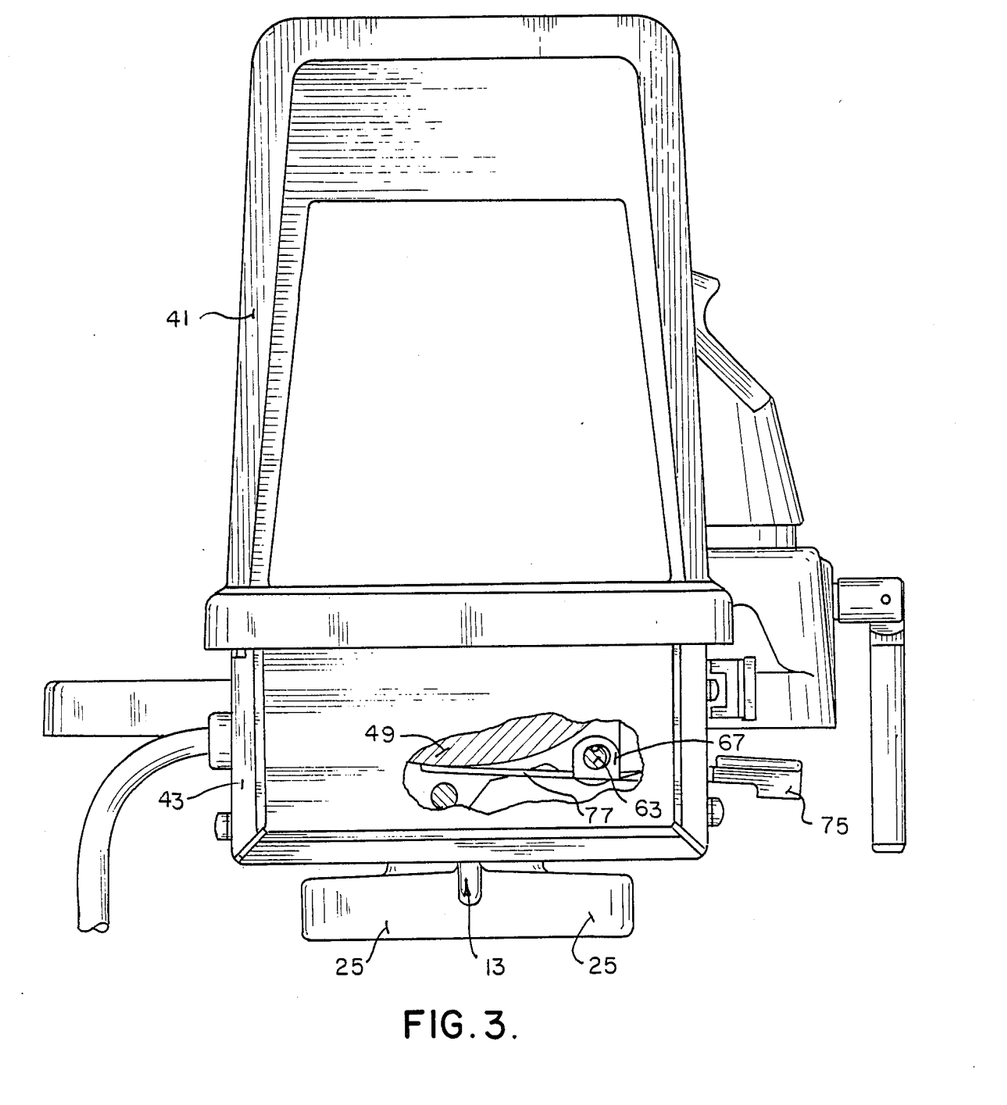
FIG. 3 is an enlarged full size fragmentary end elevational view, partly in section, showing part of the endless belt tension adjustment device incorporated in the wood lathe headstock assembly.

As best seen in FIGS. 2 and 10 of the drawings, the adjustable slot means 71 comprises a series of vertically offset and juxtaposed shoulder portions 73 which are constructed for engagement by the lever arm portion 69 of the elongated spring lever 61. The end of the lever arm portion 69 is a tension lever knob 75 to enable manual grasping and depression/raising of the elongated spring lever 61, for positioning the lever arm portion 69 thereof in engagement with one of the vertically offset and juxtaposed shoulder portions 73.

Extending from the other side of the intermediate pivot portions 67, 67 of the elongated spring lever 61 is a spring arm portion 77 which is constructed as a leaf spring so as to impart spring tension to the motor 49 throughout the various predetermined adjustable pivotal mounting locations thereof. Thus, as the lever arm portion 69 of the elongated spring lever 61 is moved upwardly or downwardly into engagement with the vertically offset shoulder portion 73 of the adjustable slot means 71, the motor 49 will be pivoted along the motor pivot shaft 59 to move the motor 49 throughout various predetermined adjustable pivotal mounting locations thereof, as determined by the vertically offset shoulder portions 73 of the adjustable slot means 71. At the same time, the pivotally mounted elongated spring lever 61, which is pivotally mounted to the motor along the pivot shaft 63, causes the spring arm portion 77 of the elongated spring lever 61 to impart spring tension to the motor 49 as the motor 49 is pivoted about the motor pivot shaft 59.

The purpose of the above construction is to adjust the belt pulley 53 and associated endless belt 79 entrained about the belt pulley 53, so as to provide the necessary tension to the endless belt 79 and thereby avoid belt slippage and attendant power loss.

As best seen in FIGS. 2, 7 and 10, the belt pulley 53, which is journalled on the motor shaft 51, comprises a series of four stepped pulley sections 81, 83, 85 and 87, from progressively larger to progressively smaller size. The headstock frame 73 supports the spindle 11, as best seen in FIG. 2 of the drawings, the inner end of which rotatably mounts the driven belt pulley 91 including four stepped pulley sections 93, 95, 97, and 99, from progressively larger to progressively smaller size.

As seen in FIG. 7 of the drawings, the driven belt pulley 91 is mounted to the spindle 11 in the headstock 73 such that the driven pulley 91 is superimposed directly above the drive pulley 53. This superimposes and aligns the stepped pulley sections 81 through 87 of the drive pulley 53 with the stepped pulley sections 93 through 99 of the driven belt pulley 91.

The endless belt 79 is constructed as a poly-V belt having a series endless internal upstanding ribs 101 (see FIG. 10) for complementary co-mating engagement with complementary configured outer surfaces of the stepped pulley sections of each of the drive and driven pulleys 53, 91. Specifically, as best seen in FIG. 2 of the drawings, the complementary configured outer surfaces of each of the stepped pulley sections associated with the drive driven belt pulleys 53, 91 have a complementary ribbed surface for co-mating engagement with the endless rib sections 101 of the poly-V belt 79. The construction and arrangement of the poly-V belt 79 with the complementary configured outer surfaces of this step pulley sections associated with both the drive and driven pulleys 53, 91 maximizes power output in a compact drive and driven belt pulley arrangement.

It will be apparent that the speed of the headstock spindle 11 may be changed by moving the endless poly-V belt 79 for engagement with different cooperating stepped pulley sections of the drive and driven belt pulley 53, 91. Specifically, as shown in FIG. 7 of the drawings, with the endless poly-V belt 79 mounted over the largest stepped pulley section 93 of the driven pulley 91 and the smallest belt pulley section 87 of the drive pulley 53, an RPM speed of 875 RPM can be achieved with a suitably engineered motor. If the endless poly-V belt 79 is moved to the left for engagement with the stepped pulley section 95 of the driven belt pulley 91 and the stepped pulley section 85 of the drive pulley 53, a speed of 1350 RPM can be achieved. Moving the endless belt to the next pulley section, upper belt pulley section 97 of the driven belt pulley 91 and the lower belt pulley section 83 of the drive pulley 53, enables a speed of 2250 RPM to be achieved. Finally, moving the endless poly-V belt 79 for engagement with the smallest belt pulley section 99 of the driven belt pulley 91 and the largest belt pulley section 81 of the drive pulley 51 can provide a speed of 3450 RPM. Obviously, the speed will vary depending on the nature of the motor and arrangement and construction of the drive and driven pulleys 53, 91, including belt pulley sections thereof.

When the endless poly-V belt 79 is adjustably moved between the various pulley belt sections of the drive and driven belt pulleys 53, 91 as described above, it will be apparent that the desired tension for the endless poly-V belt 79 may also have to be adjusted, as well. If the endless poly-V belt 79 is too loose, the endless poly-V belt 79 will slip between the drive and driven belt pulleys 53, 91 respectively causing power loss.

As described above, the motor 49, including the motor shaft mounted and journalled belt pulley 53 and entrained endless poly-V belt 79 can be adjusted about the motor pivot shaft 59, through the movement of the elongated spring lever 61 relative to various positions within the adjustable slot means 71, while enabling the leaf spring constructed spring arm portion 77 of the elongated spring lever 61 to apply spring tension to the motor 49 throughout the various predetermined adjustable pivotal mounting locations of the motor 49, about the motor pivot shaft 59.

In view of the above, it will be seen that the several objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

We claim:

1. An endless belt tension adjustment device for a motor driven belt pulley and associated endless belt, comprising:

a motor housing;

a motor positioned within said housing and having a generally horizontally extending shaft extending from the motor at least at one end thereof;

a belt pulley journalled on said generally horizontally extending motor shaft.

an endless belt entrained about said belt pulley and adapted to engage a complementary driven member;

said motor being pivotally mounted to said motor housing along one side thereof in generally horizontally parallel relationship to said generally horizontally extending motor shaft; and an endless belt adjustment device connected to said motor and extending through adjustable slot means in said motor housing, said endless belt adjustment device being constructed as an adjustable spring tension device capable of being positioned at various predetermined location within said adjustable slot means to engage and cause said motor to be pivoted relative to said motor housing in order to apply predetermined tension adjustment forces to said endless belt entrained about said motor shaft journalled belt pulley.

2. An endless belt tension adjustment device for a motor driven belt pulley and associated endless belt, comprising:
   a motor housing;
   a motor positioned within said housing and having a generally horizontally extending shaft extending from the motor at least at one end thereof;
   a belt pulley journalled on said generally horizontally extending motor shaft.
   an endless belt entrained about said belt pulley and adapted to engage a complementary driven member;
   said motor being pivotally mounted to said motor housing along one side thereof in generally horizontally parallel relationship to said generally horizontally extending motor shaft; and
   an endless belt adjustment device connected to said motor and extending through adjustable slot means in said motor housing, said endless belt adjustment device being constructed to be positioned at various predetermined locations within said adjustable slot means to engage and cause said motor to be pivoted relative to said motor housing in order to apply predetermined tension adjustment forces to said endless belt entrained about said motor shaft journalled belt pulley, said endless belt tension adjustment device including an elongated spring lever pivotally mounted to said motor for applying an adjustable spring tension to said pivotally mounted motor including said motor shaft journalled belt pulley and endless belt entrained about said belt pulley.

3. The endless belt tension adjustment device as defined in claim 2 wherein said elongated spring lever includes a lever arm portion which engages the adjustable slot means in said motor housing at various predetermined locations and a spring arm portion which engages said motor.

4. The endless belt tension adjustment device as defined in claim 3 wherein said elongated spring lever includes an intermediate pivot portion for pivotal mounting to said motor, said lever arm portion is on one side of said intermediate pivot portion for engaging adjustable slot means in said motor housing and said spring arm portion is on the other side of said intermediate pivot portion for engaging said motor.

5. The endless belt tension adjustment device as defined in claim 4 wherein said spring arm portion is constructed as a leaf spring for resilient engagement with said motor throughout various adjustable locations of said lever arm portion relative to said adjustable slot means.

6. The endless belt tension adjustment device as defined in claim 5 wherein said adjustable slot means comprises a series of vertically offset and juxtaposed shoulder portions constructed for engagement by the lever arm portion of said elongated spring lever.

7. The endless belt tension adjustment device as defined in claim 6 wherein said motor is pivotally mounted to said motor housing along a first pivot shaft which extends between opposite ends of said motor housing, and said elongated spring lever is pivotally mounted to said motor along a second pivot shaft generally parallel to said first pivot shaft and which extends between opposite ends of said motor.

8. The endless belt tension adjustment device as defined in claim 7 wherein said motor housing includes upper and lower housing sections, said motor being pivotally mounted to said lower housing section, and said upper and lower housing sections being slidably mounted with respect thereto.

9. The endless belt tension adjustment device as defined in claim 8 wherein said lower housing section includes a series of horizontally spaced and outwardly extending first shoulder portions along an upper area thereof for complementary engagement with horizontally spaced and inwardly extending second shoulder portions that underlie and engage the first shoulders of said lower housing section when said upper and lower housing sections are slidably assembled to one another.

10. The endless belt tension adjustment device as defined in claim 1 wherein said belt pulley comprises a series of stepped pulley sections each having a complementary configured outer surface for complementary co-mating engagement with an endless poly-V belt adapted to be engaged with any one of said stepped pulley sections, said endless poly-V belt being adapted to engage any one of a series of stepped pulley sections in a driven pulley member each having a corresponding complementary configured outer surface for engaging said poly-V endless belt.

11. An endless belt tension adjustment device for a motor driven belt pulley and associated endless belt, comprising:
   a motor housing;
   a motor positioned within said housing and having a generally horizontally extending shaft extending from the motor at one end thereof;
   a belt pulley journalled on said generally horizontally extending motor shaft;
   an endless belt entrained about said belt pulley and adapted to engage a complementary driven member;
   said motor being pivotally mounted to said motor housing along one side thereof in generally horizontally parallel relationship to said generally horizontally extending shaft; and
   an endless belt adjustment device including an elongated spring lever pivotally mounted to said motor and constructed to engage said motor housing at various predetermined locations to adjust said motor including the motor shaft mounted belt pulley and entrained endless belt about the pivotal mounting of said motor relative to said motor housing while also providing spring tension to said motor through the pivotal mounting of said elongated spring lever to said motor.

12. The endless belt tension adjustment device as defined in claim 11 wherein said elongated spring lever includes an intermediate pivot portion for pivotal mounting to said motor, a lever arm on one side of said intermediate pivot portion for engaging adjustable slot means in said motor housing to provide various predetermined adjustable pivotal mounting locations of said motor relative to said motor housing, and a spring arm portion constructed as a leaf spring on the other side of said intermediate pivot portion so as to impart spring tension to said motor throughout the various predetermined adjustable pivotal mounting locations thereof.

13. The endless belt tension adjustment as defined in claim 12 wherein said motor is pivotally mounted to said motor housing along a first pivot shaft which extends between opposite ends of said motor housing, and said elongated spring lever is pivotally mounted to said motor along a second pivot shaft generally parallel to said first pivot shaft and which extends between opposite ends of said motor.

14. The endless belt tension adjustment device as defined in claim 13 wherein said belt pulley comprises a series of stepped pulley sections adapted to cooperate through said endless belt with a complementary driven member also having a series of stepped pulley sections, said endless belt comprising a poly-v belt having a plurality of adjacent endless rib sections for complementary co-mating engagement with complementary configured outer surfaces on each of the stepped pulley sections of said belt pulley and complementary driven member.

* * * * *